United States Patent
Lloyd

(10) Patent No.: US 7,438,564 B2
(45) Date of Patent: Oct. 21, 2008

(54) RETAINING AND GROUNDING CLIP FOR ADAPTER MODULE

(75) Inventor: Brian Keith Lloyd, Maumelle, AR (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 11/729,737

(22) Filed: Mar. 29, 2007

(65) Prior Publication Data

US 2007/0190864 A1 Aug. 16, 2007

Related U.S. Application Data

(62) Division of application No. 11/325,174, filed on Jan. 4, 2006, now Pat. No. 7,261,602.

(60) Provisional application No. 60/641,284, filed on Jan. 4, 2005.

(51) Int. Cl.
*H01R 13/648* (2006.01)

(52) U.S. Cl. .................. 439/92; 439/607; 439/939; 174/354; 174/355

(58) Field of Classification Search .................. 439/92, 439/607, 939; 174/354, 355, 359, 382, 51
See application file for complete search history.

(56) References Cited

U.S. PATENT DOCUMENTS

| | | | | |
|---|---|---|---|---|
| 4,386,814 A | * | 6/1983 | Asick | 439/607 |
| 5,957,726 A | * | 9/1999 | Belopolsky et al. | 439/607 |
| 6,066,001 A | * | 5/2000 | Liptak et al. | 439/607 |
| 6,095,862 A | * | 8/2000 | Doye et al. | 439/607 |
| 6,120,304 A | * | 9/2000 | Harwood et al. | 439/92 |
| 6,335,869 B1 | * | 1/2002 | Branch et al. | 361/816 |
| 6,478,622 B1 | * | 11/2002 | Hwang | 439/607 |
| 6,494,623 B1 | | 12/2002 | Ahrens et al. | |
| 6,540,555 B1 | | 4/2003 | Festag et al. | |
| 6,655,995 B1 | | 12/2003 | Reisinger et al. | |
| 6,666,719 B1 | * | 12/2003 | Kuroi et al. | 439/607 |
| 6,709,280 B1 | * | 3/2004 | Gretz | 439/92 |
| 7,077,696 B2 | * | 7/2006 | Haga et al. | 439/553 |
| 7,219,404 B2 | * | 5/2007 | Haga et al. | 24/458 |

* cited by examiner

*Primary Examiner*—Gary F. Paumen
(74) *Attorney, Agent, or Firm*—Thomas D. Paulius

(57) ABSTRACT

An adapter module used to convert optical signals to electrical signals or electrical signals to optical signals utilizing a "C" shaped retaining clip to secure the adapter module housing together. The retaining clips are used in place of screws, rivets or snap fits and provide an easy and simple way to assembled adapter modules. The retaining clips require no additional structure thereby minimizing the overall size of the adapter module.

7 Claims, 3 Drawing Sheets

RETAINING AND GROUNDING CLIP FOR ADAPTER MODULE

REFERENCE TO RELATED APPLICATIONS

This application is a divisional of U.S. patent application Ser. No. 11/325,174 filed Jan. 4, 2006, now U.S. Pat. No. 7,261,602 which claims priority of prior U.S. Provisional Patent Application No. 60/641,284, filed Jan. 4, 2004.

BACKGROUND OF THE INVENTION

The present invention is directed generally to adapter modules, and more particularly to an adapter module having a retaining clip that secures the housing components of the adapter module together without the need for screws or other fasteners.

Adapter modules are used in many different applications and are usually used to contain an electrical component, such as an optical transceiver or a cable to board connector. In many instances, adapter modules house converters that are used to convert optical signals to electrical signals or electrical signals to optical signals while maintaining the signals at high speeds. These modules are usually placed in an adapter frame that surrounds a connector and is attached to a circuit board. The adapter module has a grounding structure that connects the exterior surface of the adapter module to the adapter frame or cage creating a ground path to the circuit board.

An adapter module generally has a pair of mating halves, that enclose a circuit board along with other electrical, or optical, components required to convert the high speed signals passing through the module. These housings are typically secured together by screws, rivets or other suitable fastening means which allow the adapter module to be disassembled and serviced in required. Although the screws provide a simple and easy way to secure the adapter module together, their use can be tedious and time consuming in practice. Also, the screws provide internal single ground paths between the housing halves and do not necessarily present any conductive grounding path along the exterior of the module.

Accordingly, the present invention is directed to an improved adapter module having and easily assembled housing that is cost effective and easy to use.

SUMMARY OF THE INVENTION

It is therefore a general object of the present invention to provide an adapter module that is easily assembled and slides into an adapter frame or cage mounted on a printed circuit board.

Another object of the present invention is to provide a retaining clip that secures the housing of an adapter module together without the need for screws, rivets or snap fits.

A still further object of the present invention is to provide a means for holding together an RJ-45 module together, which means holds two housing halves together and which means provides a ground path between the two halves that is accessible from the exterior of the module, such as when the module is inserted into a shielding cage or adapter frame.

Yet another object of the invention is to provide a retaining member for use with an electronic module, the retaining member having a backbone with two free ends and a central leg member extending from the backbone at an angle thereto, the leg portion also including a free end, the free ends having turned in portions that define clip ends, the three clip ends being disposed along two intersecting axes so that movement of the retaining member is limited.

Still yet a further object of the present invention is to provide a retainer member for a module that applies a compressive force to two mating housing halves in order to retain the two halves together, the retainer member having a base portion and a leg portion extending at an angle to the base portion, the base portion applying the compressive force to the module and the leg portion ensuring the position of the retainer member in place on the module, the retainer member being formed from a conductive material to provide not also a conductive grounding path between the housing halves and along the exterior of the module, the leg portion further extending into the interior of the module and providing a ground contact that contacts a plug inserted thereinto.

These and other objects, features and advantages of the present invention will be clearly understood through a consideration of the following detailed description.

BRIEF DESCRIPTION OF THE DRAWINGS

In the course of this detailed description, the reference will be frequently made to the attached drawings in which.

DETAILED DESCRIPTION OF THE PREFERRED EMBODIMENTS

Figure 1:
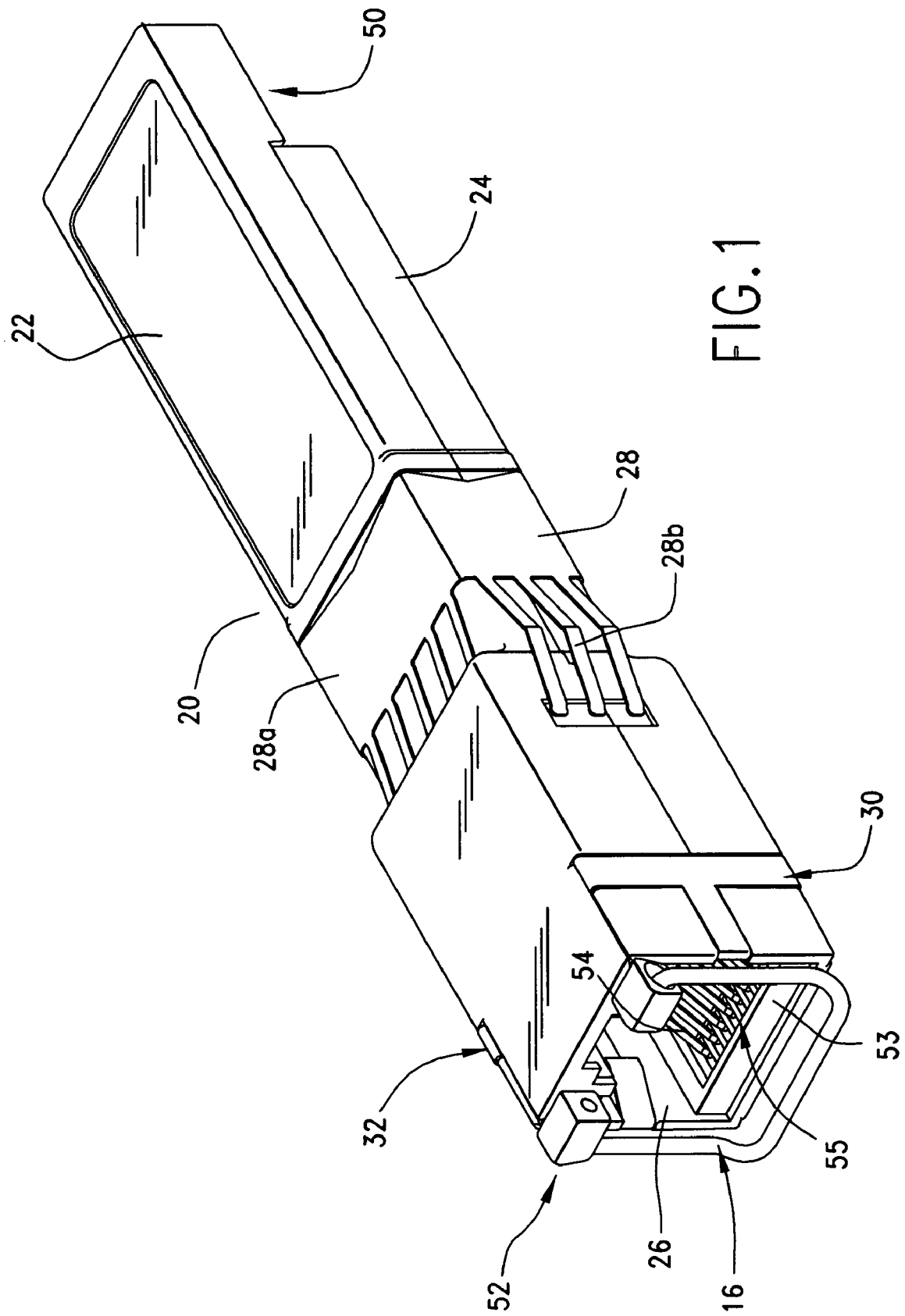
FIG. 1 is a perspective view of an adapter module with two retaining clips constructed in accordance with the principles of the present invention in place on the module holding the halves of the module together near the front end of the adapter module.

FIG. 1 illustrates the adapter module 20 of the present invention. The adapter module 20 is commonly used in the art as an adapter that is inserted into a shielding cage (not shown) and makes contact with a receptacle connector disposed within the cage. The adapter module 20 typically contains a circuit board, the end of which extends out of the rear end 50 of the module 20. As is common in the art, a edge of this circuit board is received in a receptacle connector held in a shielding cage. The adapter module 20 is one that has a uniquely configured opening 26 at its front end 52. This opening 26 is preferably configured to receive an RJ-45-style jack.

Figure 2:
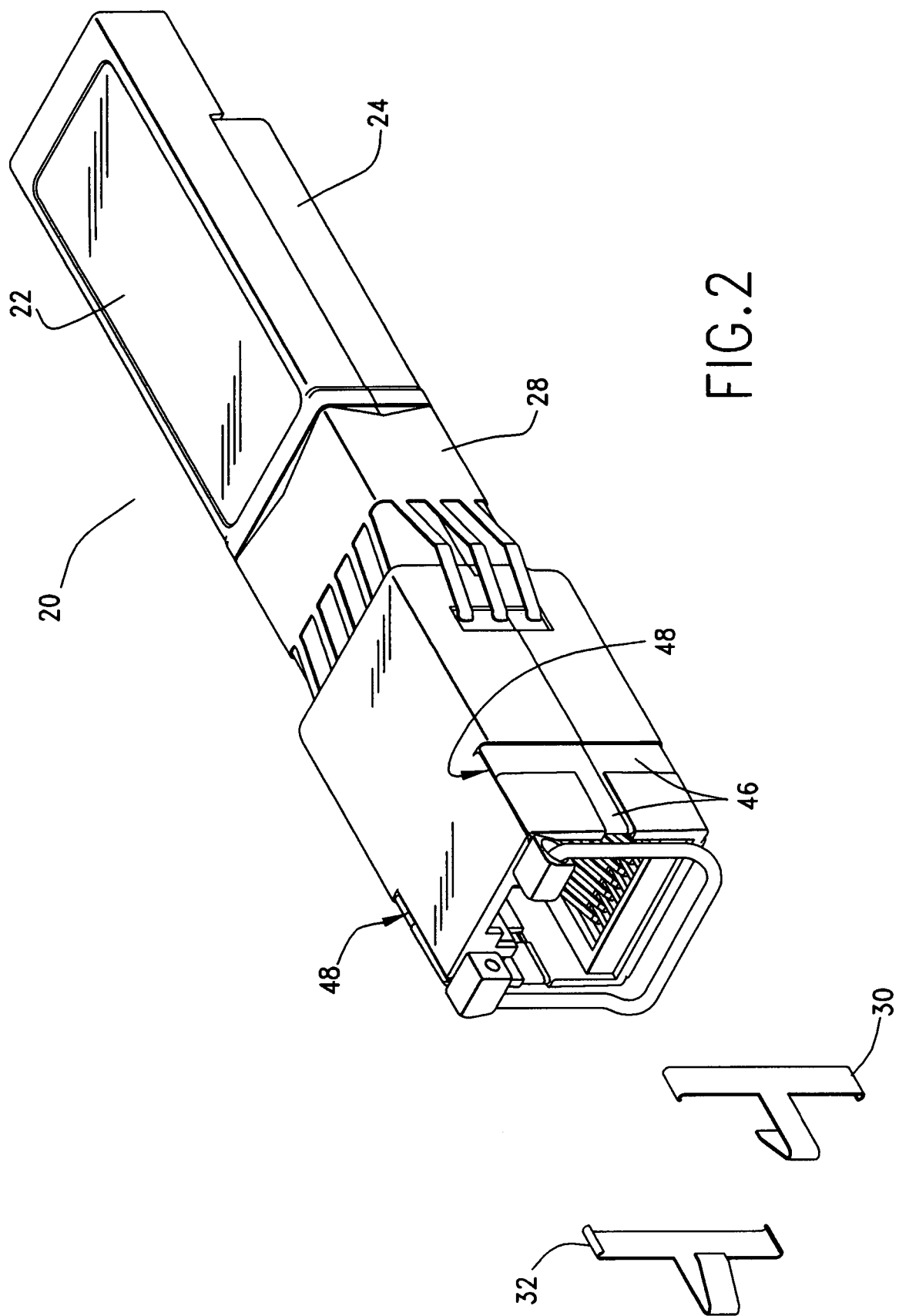
FIG. 2 is a the same view as FIG. 1, but with the retaining clips shown separated from the adapter module for clarity to show the grounding leg portions that extend from the retaining clips into the interior of the adapter module.
Figure 3:
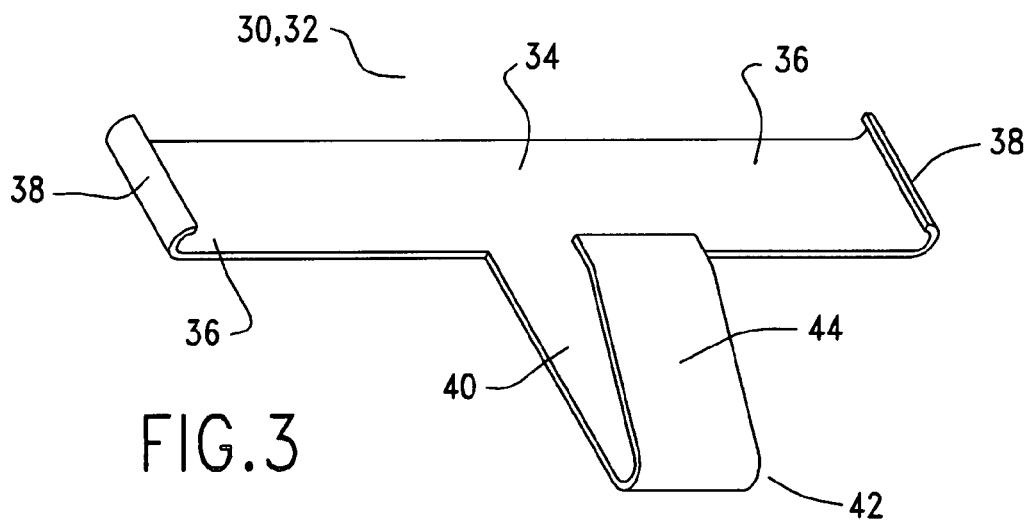
FIG. 3 is a perspective view of one of the retaining clips.

Such a receptacle includes a plurality of wire contacts 54 arranged in individual channels or slots 55, which are aligned with corresponding conductive leads or wires in an opposing plug connector (not shown). The plug connector is inserted into the opening to effect a connection between the wires terminated to the plug connector and circuits on the circuit board enclosed within the module 20. A means by which the module 20 may be removed from a corresponding shielding cage or adapter frame may be provided and such a means is shown in FIGS. 1 & 2 as a bail latch 16 which is rotatably held at the end of the module 20 and which provides a grip surface by which a user can grab the adapter module 20.

The module 20 can be seen to include a top housing half 22 and a bottom housing half 24 that when assembled together, define the overall body of the adapter module 20. The top and bottom housings 22, 24 also cooperatively define the receptacle opening 26 at the front end of the adapter module 20. The body of the adapter module 20 is usually formed of a conductive material but it may also be formed from a non-conductive material. A grounding gasket is shown 28 as attached to the exterior of the adapter module 20 that interconnects the exterior of the adapter module to the inner surface of an adapter frame or shielding cage (not shown). The grounding gasket creates multiple points of connection along the exterior of the module 20 such as by its collar portion 28a and its finger portions 28b a grounding path from the adapter module through the grounding gasket and adapter frame to the printed circuit board (not shown) that the adapter frame is mounted upon. A pair of retaining clips 30, 32 are attached to the front of the adapter module 20 thereby securing the top housing 22 and the bottom 24 housing together.

The retaining clips 30, 32 serve to mechanically hold the front end of the housing halves 22, 24 together and they also electrically interconnect them together for purposes of defining a grounding path between the two halves 22, 24. These clips 30, 32 also extend partially into the interior of the RJ-45 receptacle and, as such, provide a means for contacting ground portions on the opposing plug and thereby provide a means for grounding the plug inserted into the opening 26.

FIG. 3 to FIG. 6 show the retaining clips 30, 32 in greater detail. The retaining clip 30, 32 is preferably stamped and formed from a conductive material, such as a sheet metal and consists of a flat body, or backbone portion, 34 having two free ends 36. These free ends 36 are vertically oriented on each clip, when installed on the adapter module 20, and each free end 36 preferably terminates in a curved hook, or engagement portion, 38. As can be seen in FIGS. 1 & 2, these hook portions 38 engage slots 48 formed in the exterior surfaces of the adapter module. The hook portions 38 extend transversely to the body portions 34, but lengthwise of the adapter module 20.

Figure 4:
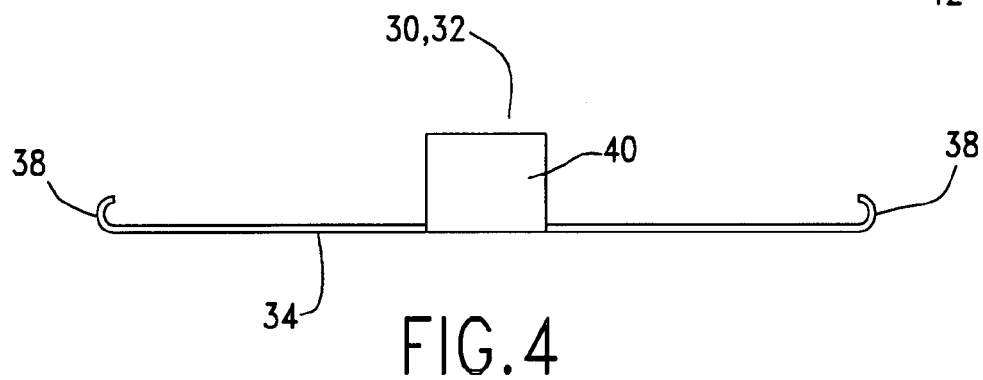
FIG. 4 is a front view of the retaining clip in FIG. 3.
Figure 5:
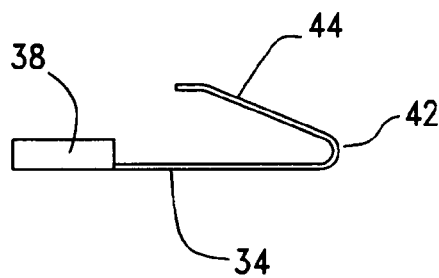
FIG. 5 is a side view of the retaining clip in FIG. 3.
Figure 6:
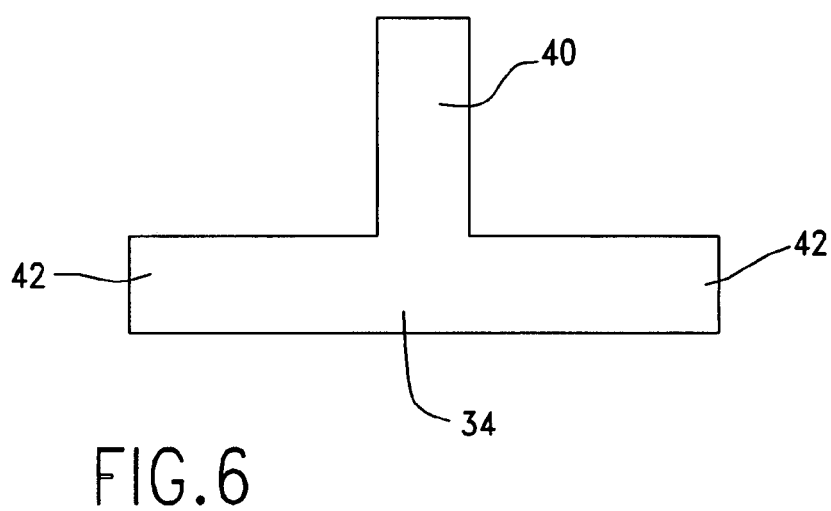
FIG. 6 is a top view of the retaining clip in FIG. 3.

The clip further includes a leg portion 40 that extends from the body portion 34 in a perpendicular direction from the body portion. The body portion of the clip may be considered as extending along a first line of action, and the leg portion extending along a second line of action. The distal end 42 of the intermediate leg also terminates in a free end with an end tab 44 that is bent back upon itself. The end tab 44 is bent more than 90 degrees but less than 180 degrees as shown in FIG 5. As can be seen in FIG 4, the curved hook portions 38 positioned at each end of the body portion 34 form the shape of a "C". The leg portion, when applied to the module, extends along the area where the top and bottom housing halves meet. This is in about the center of the body portion of the retaining clip.

FIG. 2 shows the adapter module 20 with the retaining clips 30,32 exploded away from the adapter module. The adapter module housings 22, 24 have recesses 46, 48 formed at the front end of the adapter module that are adapted to receive the retaining clips therein. The depth of the recesses is slightly greater than the thickness of the retaining clips so that when assembled the surfaces of the retaining clips do not extend past the outer surfaces of the adapter module housing. This will prevent any stubbing that may occur when the adapter module is inserted into the adapter frame. Grooves 48 are formed on the outer surface of both the top and bottom housings 22, 24 and correspond to the location of the hook portion 38 of the retaining clips 30, 32. The distance between the grooves on corresponding top and bottom housings is slightly greater than the distance between the hook portions of the retaining clips. The retaining clips resiliently deflect to accommodate this difference and therefore bias the housing together creating a tight and secure fit.

Referring to FIG. 1, the end tab 44 formed at the distal end of the intermediate leg portion of each retaining clip will extends into the opening 26 of the adapter module 20. The effect of the end tabs is to effect a biasing force of the plug connector (not shown) inserted into the opening of the adapter module and provide a grounding path from the plug connector to the exterior of the adapter module 20. Thus, it will be understood that the clips prevent a loose fit condition between the adapter module and the plug that can jeopardize the integrity of the electrical connection therebetween that may result in a failed connection, and also provide a complete grounding path from the plug and adapter module to a frame or cage into which the adapter module sits.

While the preferred embodiment of the invention have been shown and described, it will be apparent to those skilled in the art that changes and modifications may be made therein without departing from the spirit of the invention, the scope of which is defined by the appended claims.

The invention claimed is:

1. An adapter module for insertion into and removal from an adapter frame, the module comprising:

a housing formed from at least two distinct parts, the housing having a forward portion and a rear portion, the housing forward portion having an opening disposed therein, the housing rear portion being received in the adapter frame and the front portion including at least one recess; and, a conductive gasket disposed on said housing and extending from said housing rear portion to said housing forward portion, the gasket including a base portion that contacts said housing rear portion and a plurality of individual fingers that extend away from the gasket base portion toward said housing front portion, free ends of some of the gasket fingers extending into the housing recess, thereby maintaining multiple points of contacts between said housing rear and forward portions.

2. The adapter module of claim 1, wherein said gasket base portion includes a collar portion that at least partially encircles and contacts said housing rear portion.

3. The adapter module of claim 2, wherein said gasket fingers extend away from said gasket collar portion lengthwise along said housing, said gasket fingers contacting said housing forward portion at multiple points of contact.

4. The adapter module of claim 1, wherein said gasket includes at least two distinct sides.

5. The adapter module of claim 1, wherein said gasket includes multiple sides and said fingers are disposed on at least two distinct sides of said collar portion.

6. The adapter module of claim 1, wherein said some of said fingers extend away from said collar portion and contact exterior side surfaces of said housing forward portion.

7. The adapter module of claim 1, wherein said housing forward portion opening receives an RJ-45 jack therein.

* * * * *